United States Patent
Seki et al.

(10) Patent No.: US 9,543,579 B2
(45) Date of Patent: Jan. 10, 2017

(54) LITHIUM ION SECONDARY BATTERY

(71) Applicant: Hitachi, Ltd., Tokyo (JP)

(72) Inventors: Eiji Seki, Tokyo (JP); Naoki Kimura, Tokyo (JP); Seogchul Shin, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 14/740,342

(22) Filed: Jun. 16, 2015

(65) Prior Publication Data

US 2016/0013484 A1 Jan. 14, 2016

(30) Foreign Application Priority Data

Jul. 8, 2014 (JP) .................................. 2014-140243

(51) Int. Cl.

| H01M 4/38 | (2006.01) |
|---|---|
| H01M 4/36 | (2006.01) |
| H01M 4/587 | (2010.01) |
| H01M 10/0525 | (2010.01) |

(52) U.S. Cl.
CPC ............. *H01M 4/386* (2013.01); *H01M 4/364* (2013.01); *H01M 4/587* (2013.01); *H01M 10/0525* (2013.01); *Y02E 60/122* (2013.01)

(58) Field of Classification Search
CPC ...... H01M 4/386; H01M 4/364; H01M 4/587; H01M 10/0525; Y02E 60/122
See application file for complete search history.

(56) References Cited

U.S. PATENT DOCUMENTS

| 6,730,434 | B1 * | 5/2004 | Kawakami | C22C 45/00 |
|---|---|---|---|---|
| | | | | 429/218.1 |
| 7,972,727 | B2 * | 7/2011 | Christensen | H01M 4/134 |
| | | | | 420/578 |
| 2012/0040244 | A1 * | 2/2012 | Kwon | H01M 4/134 |
| | | | | 429/211 |

FOREIGN PATENT DOCUMENTS

| JP | 2008-277232 A | 11/2008 |
|---|---|---|
| JP | 2013225502 A | * 10/2013 |

* cited by examiner

*Primary Examiner* — Gregg Cantelmo
(74) *Attorney, Agent, or Firm* — Volpe and Koenig, P.C.

(57) ABSTRACT

A lithium ion secondary battery includes: a positive electrode including a positive electrode active material; a negative electrode formed by coating a negative electrode active material mixture onto a surface of a negative electrode collector, the negative electrode active material mixture including a negative electrode active material, a conductive additive, and a binder; a separator interposed between the positive electrode and the negative electrode; and an electrolyte, in which the negative electrode active material includes graphite and an Si alloy, inequities of $0.43 \leq x \leq 9.0$ and $8 \leq y < 18$ are satisfied when a mass ratio of the graphite and the Si alloy is defined as x and a coating amount of the negative electrode active material mixture is defined as y (mg/cm$^2$). Thus, an initial capacity thereof can be increased and a capacity retention rate thereof can be improved in the lithium ion secondary battery which includes the Si alloy in the negative electrode.

13 Claims, 2 Drawing Sheets

LITHIUM ION SECONDARY BATTERY

CLAIM OF PRIORITY

The present application claims priority from Japanese Patent application serial No. 2014-140243, filed on Jul. 8, 2014, the content of which is hereby incorporated by reference into this application.

BACKGROUND OF THE INVENTION

1. Field of the Invention

The present invention relates to a lithium ion secondary battery.

2. Description of the Related Art

In recent years, lithium ion secondary batteries have been noted particularly as secondary batteries having high energy density, and their research, development, and commercialization have been progressed rapidly. At present, lithium ion secondary batteries have been generally popularized as small-sized domestic use for mobile phones and notebook personal computers. Further, large-scale secondary batteries of higher capacity than usual have been demanded as batteries for domestic, industrial, on-board uses etc. in view of problems or issues such as global warming, fuel exhaustion, and denuclearization.

As measures of increasing the capacity of the lithium ion secondary batteries, it has been known to use silicon (Si) or Si-containing compounds for negative electrode materials. However, Si involves a problem in view of rate characteristics since Si has a powder resistance which is two orders of magnitude higher than that of graphite. Further, increase of the coating amount of the electrode has not been investigated since Si involves a problem in the cycle life.

JP-2008-277232-A describes use of a negative electrode material for a lithium secondary battery, the negative electrode material disposing carbonaceous material particles containing at least one element selected from graphite and carbon black on surfaces of composite particles containing graphite particles, fine Si particles and amorphous carbon (A), in which the carbonaceous material particles are coated with amorphous carbon (B), in order to increase initial charge/discharge capacity and improve charge/discharge cycle characteristics of the lithium secondary battery. The configuration described above can moderate a volume change of the fine Si particles and maintain an electric contact of the active material during charge/discharge, thereby improving charge/discharge cycle characteristics.

SUMMARY OF THE INVENTION

To increase the capacity further, it is necessary to increase the mixing ratio of Si and to increase the coating amount further. As the mixing amount and the coating amount of Si are increased, the capacity can be increased, and yet the capacity retention rate may lower.

The present invention intends to provide a lithium ion secondary battery including an Si alloy in a negative electrode, the lithium ion secondary battery having an increased initial capacity and an improved capacity retention rate.

The present invention provides a lithium ion secondary battery having: a positive electrode including a positive electrode active material; a negative electrode formed by coating a negative electrode active material mixture onto a surface of a negative electrode collector, the negative electrode active material mixture including a negative electrode active material, a conductive additive, and a binder; a separator interposed between the positive electrode and the negative electrode; and an electrolyte. The negative electrode active material contains a graphite and an Si alloy. When a mass ratio of the graphite and the Si alloy is defined as x and a coating amount of the negative electrode active material mixture is defined as y (mg/cm$^2$), the following inequities are satisfied: $0.43 \leq x \leq 9.0$ and $8 \leq y < 18$.

The present invention can increase the initial capacity by increasing the coating amount, and can improve the capacity retention rate in the lithium ion secondary battery in which the Si alloy is used for the negative electrode.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

As a result of earnest studies about a negative electrode including an Si alloy, the present inventors have found that it is effective to define a mass ratio of the Si alloy and a graphite, and define a coating amount of a negative electrode active material mixture in appropriate ranges.

The amounts of graphite particles and Si alloy particles in the negative electrode active material are defined within a range of the mass ratio of 30:70 to 90:10. That is, a value obtained by dividing the mass of the graphite with the mass of the Si alloy (graphite mass/Si alloy mass) is within a range of 0.43 to 9.0 (the divided value is hereinafter referred to as the mass ratio x of the graphite and the Si alloy.). Further, the coating amount of the negative electrode active material mixture is determined such that a capacity of the positive electrode is equal with the capacity of the negative electrode, and the coating amount y (mg/cm$^2$) is within a range of 8 to 18 mg/cm$^2$. As a result, the initial capacity can be increased and the capacity retention rate can be improved.

In particular, when the relation between x and y is $y \leq -4.29x^{-1}+17.98$, high rate characteristics are obtained preferably. Further, a further high capacitance can be attained preferably when the coating amount y of the negative electrode active material mixture is controlled as $y \geq 1.11x+7.5$.

(Configuration of Lithium Ion Secondary Battery)

Figure 1:
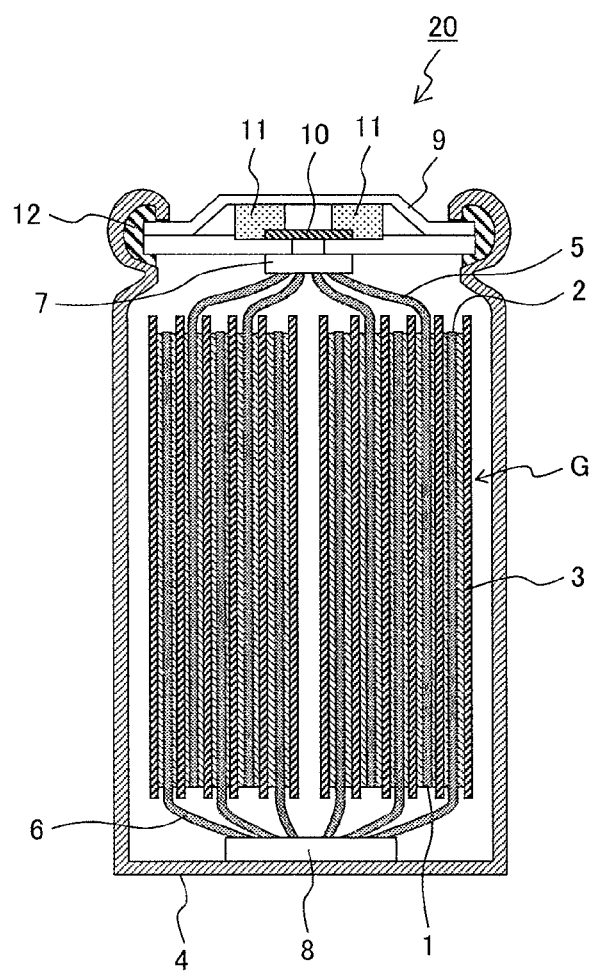
FIG. 1 is a schematic cross sectional view illustrating a lithium ion secondary battery according to a preferred embodiment of the invention.

A preferred embodiment of a lithium ion secondary battery according to the invention is described with reference to FIG. 1.

A lithium ion secondary battery 20 has an electrode group G prepared by winding a positive electrode plate 1 (positive electrode) and a negative electrode plate 2 (negative electrode) interposing a separator 3 therebetween and a battery case 4 made of a nickel-plated steel sheet and having a bottomed cylindrical configuration. The electrode group G is housed in a battery case 4.

A positive electrode collector lead portion 7 made of aluminum for collecting current from the positive electrode plate 1 is disposed substantially along an extension from a winding center above the electrode group G. Ends of positive electrode collector lead pieces 5 led from the positive electrode 1 are ultrasonically joined to the positive electrode collector lead portion 7. A disk-like battery lid 9 as a positive electrode external terminal is disposed above the positive electrode lead portion 7.

The battery lid 9 is composed of a terminal plate made of a disk-like stainless steel sheet in which a central portion is protruded upward and a flat plate made of an annular aluminum plate in which an opening is formed at a central portion for gas exhaustion. An annular positive electrode terminal portion 11 is interposed between the protrusion of the terminal plate and the flat plate. The positive electrode terminal portion 11 is in contact at an upper surface and a lower surface thereof with a lower surface of the terminal plate and an upper surface of the flat plate respectively. An inner diameter of the positive electrode terminal portion 11 is made larger than an inner diameter of the opening formed in the flat plate. A burst valve 10 that bursts upon excessive increase of a battery inner pressure is disposed above the opening of the flat plate so as to close the opening. A circumferential edge of the burst valve 10 is put between a lower surface of the inner edge of the positive plate terminal portion 11 and the flat plate. A circumferential edge of the terminal plate and a circumferential edge of the flat plate are secured. A upper surface of the positive electrode collector lead portion 7 is joined to a bottom of the battery lid 9 (a surface on a side of the electrode group G) by a resistance welding.

Below the electrode group G, a negative electrode collector lead portion 8 made of nickel is disposed for collecting the current from the negative electrode plate 2. Ends of the negative electrode collector lead pieces 6 led from the negative electrode plates 2 are ultrasonically joined to the negative electrode collector lead portion 8. The negative electrode collector lead portion 8 is joined by the resistance welding to the inner bottom of the battery case 4 that also serves as the negative electrode external terminal.

Further, a non-aqueous electrolyte is injected into the battery case 4. As the non-aqueous electrolyte, a solution of lithium hexafluorophosphate ($LiPF_6$) is used which is dissolved at a concentration of 1 mol/liter in an organic solvent mixture composed of ethylene carbonate (EC) and ethyl methyl carbonate (EMC) at a 1:2 volume ratio. The battery lid 9 is caulked with a gasket 12 interposed between the battery lid 9 and the battery case 4 to the upper portion of the battery case 4. Accordingly, the inside of the lithium ion secondary battery 20 is tightly sealed.

In the battery group G housed in the battery case 4, the positive electrode plate 1 and the negative electrode plate 2 are wound with a finely porous separator 3 interposed therebetween so that the positive electrode 1 and the negative electrode 2 are not in contact with each other. For example, the finely porous separator 3 is made of polyethylene. The positive electrode lead pieces 5 and the negative electrode lead pieces 6 are respectively disposed oppositely to each other on an upper base and a lower base of the electrode group G having a cylindrical shape. An insulation coating is applied to the entire outer circumference of the electrode group G so as to prevent an electric contact with the battery case 4.

In the positive electrode plate 1, a positive electrode mixture containing a positive electrode active material is coated substantially uniformly on both surfaces of the positive electrode collector. As the positive electrode active material of the lithium ion secondary battery, various kinds of lithium-transition metal compound oxides used so far can be used. For example, positive electrode active materials such as lithium nickelate, lithium cobaltate, lithium manganate can be used by partially substituting Ni, Co, Mn or the like with one or more transition metals.

For the positive electrode active material mixture, a conductive material and a binder are used in addition to the positive electrode active material. Materials used so far can be used optionally, for example, carbon material such as graphite for the conductive material and polyvinylidene fluoride (hereinafter simply referred to as PVDF) for the binder.

The positive electrode is manufactured, for example, by using an aluminum foil of 20 μm thickness as the positive electrode collector and $LiNi_{1/3}Co_{1/3}Mn_{1/3}O_2$ which is a lithium-containing transition metal compound oxide as the positive electrode active material, and coating a positive electrode mixture in which the positive electrode active material, graphite and PVDF are blended at a ratio controlled to 90:5:5 by weight on both surfaces.

On the other hand, in the negative electrode plate 2, a negative electrode mixture containing a negative electrode active material is coated substantially uniformly on both surfaces of the negative electrode collector. The coating layer of the mixture is formed by preparing a negative electrode active material mixture in which a binder and a conductive additive are dispersed in a solvent in addition to Si alloy particles and natural graphite particles as the negative electrode material, and coating the dispersion on the surface of the negative electrode collector. As the binder, polyamideimide, polyimide, or polyamide, or those containing one or more of them can be used.

As the negative electrode active material, a mixture of natural graphite and an Si alloy is used. Preferred graphite can be properly selected and natural graphite is preferred because of its inexpensiveness.

The Si alloy usually has a fine structure in which a plurality of phases are present together. In other words, in the Si alloy, fine particles of silicon (Si) are dispersed in particles of other constituent elements, or other constituent elements are dispersed in Si particles. Other constituent elements may contain one or more of Al, Ni, Cu, Fe, Ti, and Mn. The method of manufacturing the Si alloy includes a mechanical synthesis method by a mechanical alloying method or a method of heating and cooling a mixture of Si particles and other constituent elements.

The composition of the Si alloy is preferably 50:50 to 90:10 in view of the atomic ratio of Si and other constituent element. In other words, the atomic ratio of Si in the Si alloy is preferably 50 to 90%. The atomic ratio is 60:40 to 80:20 more preferably.

(Battery Assembling)

A method of manufacturing the lithium ion secondary battery 20 is described below.

The electrode group G is manufactured by drying the positive electrode plate 1 and the negative electrode plate 2 manufactured as described above at 100° C. for 24 hours in vacuum, putting the separator 3 between the positive electrode plate 1 and the negative electrode plate 2, and winding them. In this process, they are wound preferably such that the positive electrode plate 1 and the negative electrode plate 2 properly oppose each other and the positive electrode collector lead pieces 5 and the negative electrode collector pieces 6 are situated in the directions opposite to each other.

Next, all of the positive electrode collector lead pieces 5 are ultrasonically joined to the positive electrode collector lead portion 7, and all of the negative electrode collector lead pieces 6 are ultrasonically joined to the negative electrode collector lead portion 8. Subsequently, an insulation coating is applied to the periphery of the electrode group G, and the electrode group G having the positive electrode collector lead portion 7 and the negative electrode collector lead portion 8 connected thereto is inserted in the battery case 4 with the negative electrode collector lead portion 8 being directed to the bottom.

An electrode rod is passed through a winding central portion of the electrode group G, joining the negative electrode collector lead portion 8 and the inner bottom of the battery case 4 by the resistance welding, and thereafter the positive electrode collector lead portion 7 and the battery lid 9 are joined by the resistance welding. Then, a non-aqueous electrolyte is injected inside the battery case 4, and thereafter the battery lid 9 is caulked to the battery case 4 with the gasket 12 interposed between the battery lid 9 and the battery case 4. Thus, a lithium ion secondary battery having a battery capacity of 1 Ah grade is completed.

EXAMPLE

Examples are described below.

A negative electrode was manufactured by using a copper foil of 10 μm thickness as a negative electrode collector and coating a negative electrode mixture composed of a negative electrode active material, a conductive additive and a binder at a mass ratio of 93:2:5 on both surfaces of the negative electrode collector. The negative electrode active material is a mixture of a natural graphite and an Si alloy. As a result of X-ray diffractometry (XRD) for the natural graphite, the interlayer distance d(002) of a carbon hexagonal network plane was 0.335 nm, and the crystallite size was 120 nm or more in the direction of the hexagonal network lamination Lc(002) and 110 nm or more in the direction of the carbon hexagonal network plane La(110). The Si alloy was prepared by mixing Si and other metals by a mechanical alloying method. The obtained Si alloy has a compositional formula represented by $Si_{70}Ti_{10}Fe_{10}Al_{10}$. A polyamideimide was used as the binder and acetylene black was used as the conductive additive. The mass ratio of the negative electrode active material, the conductive additive and the binder was 93:2:5. N-methylpyrrolidone (NMP) was used as a solvent and viscosity of the negative electrode mixture was controlled depending on the amount of the solvent.

After drying a coating layer formed on the surface of the negative electrode collector, it was roll-pressed by a roll press device such that the density of the negative electrode active material mixture layer was 2.3 g/cm$^3$. The density of the negative electrode material mixture layer is a maximum value that can be attained by usual roll pressing. Then, the coating layer was dried at 250° C. for curing the polyamideimide.

Various kinds of negative electrodes were manufactured by changing the mixing ratio of the natural graphite and the Si alloy, and changing the coating amount of the negative electrode active material mixture layer. Generally, the capacity retention rate lowers as the coating amount increases. On the other hand, a negative electrode capacity lowers while the capacity retention rate increases as the coating amount decreases. Further, the coating amount can be increased by increasing the ratio of the graphite. However, excessive increase of the graphite ratio is not preferred since the coating amount becomes substantially constant. On the other hand, the coating amount needs to be decreased and the electrode density becomes lower as the Si ratio increases.

Table 1 shows the ratios of the graphite and the Si alloy constituting the negative electrode material and the coating amounts of the negative electrode active material mixture in Examples 1 to 6 and Comparative Examples 1 to 5.

TABLE 1

| Negative electrode material | Graphite (mass %) | Si alloy (mass %) | Coating amount y (mg/cm$^2$) |
|---|---|---|---|
| Example 1 | 30 | 70 | 8 |
| Example 2 | 50 | 50 | 13 |
| Example 3 | 70 | 30 | 15 |
| Example 4 | 90 | 10 | 17.5 |
| Example 5 | 86 | 14 | 14 |
| Example 6 | 80 | 20 | 12 |
| Comp. Example 1 | 100 | 0 | 18 |
| Comp. Example 2 | 88 | 12 | 4.5 |
| Comp. Example 3 | 0 | 100 | 3.3 |
| Comp. Example 4 | 0 | 100 | 5 |
| Comp. Example 5 | 90 | 10 | 18 |

(Measurement for Negative Electrode Capacity and Capacity Retention Rate)

Negative electrode capacity and rate characteristics of Examples 1 to 6 and Comparative Examples 1 to 5 were measured as described below.

The manufactured negative electrode is fabricated to a size of ϕ16 mm and thereafter the negative electrode capacity was measured by using Li for a counter electrode. Charge conditions were those of constant current constant voltage charge at a voltage of 5 mV with a current corresponding to 0.2 C for 6 hours. Discharge conditions were those of constant current discharge with a discharge current corresponding to 0.2 C at a voltage of 1.5 V. The discharge capacity in this case was determined as a negative electrode capacity (an initial capacity).

After measuring the negative electrode capacity, 1 C discharge capacity was measured and determined as rate characteristics. The charge conditions were those of constant current constant voltage charge at a voltage of 5 mV with a current corresponding to 0.2 C for 6 hours. The discharge conditions were those of constant current discharge with a discharge current corresponding to 1 C at a voltage of 1.5 V. The discharge capacity in this case was divided by 0.2 C capacity (negative electrode capacity) and calculated as the capacity retention rate.

In the measurement, 1 C is a current value at which charge or discharge for the battery capacity is completed for one hour, and 0.2 C is a current value at which charge or discharge for the battery capacity is completed for 5 hours. Table 2 shows the results of measurements for the negative electrode capacities and the capacity retention rates of Examples 1 to 6 and Comparative Examples 1 to 5.

TABLE 2

| | Graphite mass/ Si alloy mass x | Coating amount y (mg/cm$^2$) | Negative electrode capacity (mAh) | Capacity retention rate (%) |
|---|---|---|---|---|
| Example 1 | 0.43 | 8 | 13.9 | 70 |
| Example 2 | 1.00 | 13 | 19.6 | 70 |
| Example 3 | 2.33 | 15 | 17.3 | 70 |
| Example 4 | 9.00 | 17.5 | 14.6 | 70 |
| Example 5 | 6.00 | 14 | 13.9 | 80 |
| Example 6 | 4.00 | 12 | 13.4 | 80 |
| Comp. Example 1 | Only graphite | 18 | 12.6 | 70 |
| Comp. Example 2 | 7.30 | 4.5 | 7.2 | 85 |
| Comp. Example 3 | Only Si alloy | 3.3 | 5.3 | 70 |
| Comp. Example 4 | Only Si alloy | 5 | 13.9 | 50 |
| Comp. Example 5 | 9.00 | 18 | 15.5 | 55 |

(Investigation of Measurement Result)

Examples 1 to 4 are examples in which the mass ratios x of the graphite mass/Si alloy mass were changed and the coating amounts were controlled such that the capacity retention rates were 70%. Examples 5 and 6 are examples in which the coating amounts were controlled such that the capacity retention rates were 80%. In Examples 1 to 6, the negative capacities could be increased and the capacity retention rates could be maintained compared with Comparative Example 1. That is, the capacities could be increased to 12.6 mAh or more.

Comparative Example 1 is an existent example using only graphite for the negative electrode active material (not using Si alloy). The coating amount was adjusted so that the capacity retention rate was 70%, and was controlled to 18 mg/cm². In the same manner, Comparative Example 3 is an example using only the Si alloy for the negative electrode active material (not using graphite) and controlling the coating amount to 3.3 mg/cm² such that the capacity retention rate was 70%. Comparative Example 4 is an example using only the Si alloy for the negative electrode active material and controlling the coating amount to 5 mg/cm² which was more than that of Comparative Example 3. Comparative Example 5 is an example in which the value for the mass ratio of the graphite and the Si alloy (x) was equal with that of Example 4 and the coating amount was controlled to 18 mg/cm² which was more than that of Example 4 and identical with that of Comparative Example 1. Comparative Example 2 is an example in which the value of the mass ratio of the graphite and the Si alloy (x) was 7.3 and the coating amount was controlled to 4.5 mg/cm² such that the capacity retention rate will be high.

Examples and comparative examples were compared being indicated on graphs to show a preferred range of the present invention.

Figure 2:
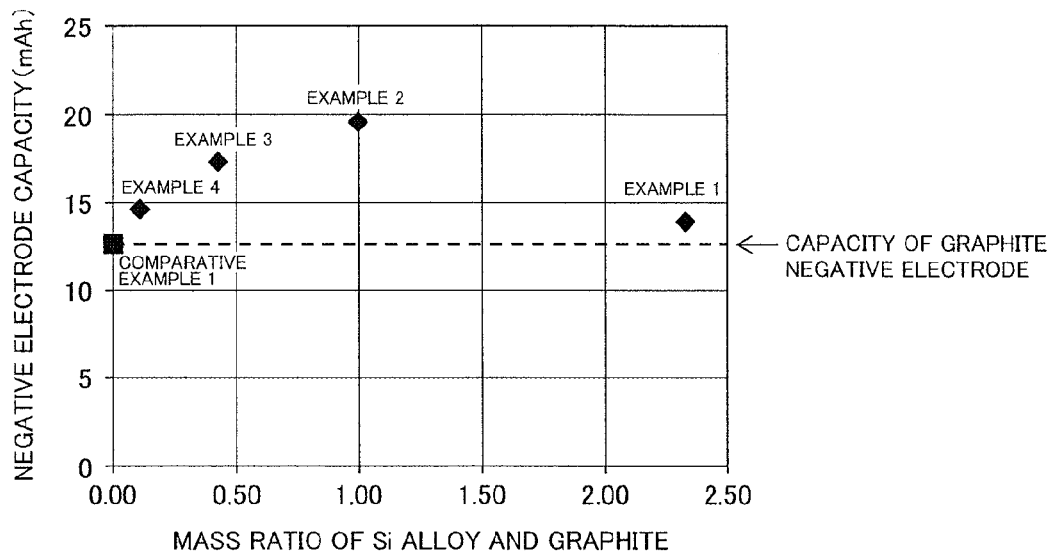
FIG. 2 is a graph illustrating a negative electrode capacity to a mass ratio of an Si alloy and graphite.

FIG. 2 is a graph showing a relation between the mixing ratio and the negative electrode capacity at the capacity retention rate of 70%.

Comparative Example 1 is an example corresponding to a graphite negative electrode which was put to practical use (the mass ratio of the Si alloy and the graphite is 0). In Examples 1 to 4, the range of the mass ratio of the Si alloy and the graphite (1/x) is within 0.1 to 2.3. In this range, the negative electrode capacity can be improved with the capacity retention rate of the graphite negative electrode maintained at 70%. Outside of the range described above is not preferred since the negative electrode capacity lowers when the retention rate of the graphite negative electrode is maintained. Accordingly, it is necessary that the mixing ratio of the negative electrode active materials is such that the graphite particles are 30 to 90 mass %, the Si alloy is 10 to 70 mass %, and the mass ratio of the graphite and the Si alloy (x) is 0.43 to 9.0. In particular, high negative electrode capacitance is shown preferably in the range of the mass ratio of the Si alloy and the graphite (1/x) of 0.5 to 1.7, that is, in the range of the mass ratio of the graphite and the Si alloy (x) of 0.6 to 2.0.

Figure 3:
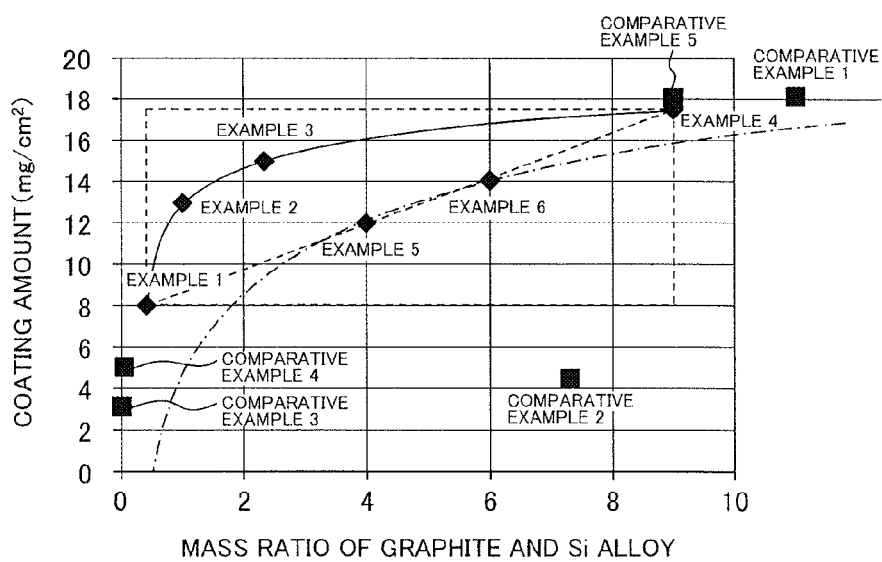
FIG. 3 is a graph illustrating a coating amount to a mass ratio of the graphite and the Si alloy.

FIG. 3 shows the coating amount to the mass ratio of the graphite and the Si alloy. The abscissa represents the mass ratio of the graphite and the Si alloy, while the ordinate represents the coating amount. Examples are indicated by "♦" and comparative examples are indicated by "■".

In FIG. 3, experimental data for a solid curve are those for Examples 1 to 4 and Comparative Example 1 at the capacity retention rate of 70%, whereas the experimental data for a one dotted chain curve are those for Examples 5 and 6 at the capacity retention rate of 80%. The curves mean that the capacity retention rate lowers as the coating amount increases, and that the coating amount needs to be decreased when the graphite ratio is low in order to attain a certain capacity retention rate.

Since the capacity retention rate lowers as the coating amount increases, the coating amount is preferably smaller in order to attain a high capacity retention rate. To avoid disadvantage due to the increase of the coating amount, the coating amount y needs to be less than the coating amount of Comparative Example 1 (18 mg/cm²). On the other hand, the capacity lowers as the coating amount decreases. Thus, to increase the capacity more than the capacity of Comparative Example 1, the coating amount y needs to be at least 8 mg/cm² or more.

In particular, to attain the capacity retention rate of 70% or more, the coating amount is preferably set below the solid curve. On the basis of an approximation of the curve, the following mathematical expression (1) is preferably satisfied assuming the mass ratio of the graphite and the Si alloy as x and the coating amount as y:

$$y \le -4.29x^{-1} + 17.98 \qquad \text{mathematical expression (1)}.$$

Further, even when a high capacity retention rate is attained, the capacity per weight of the mixture becomes low if the graphite ratio is high, and the coating amount decreases if the graphite ratio is low. As a result, the negative electrode capacity lowers. Examples 1, 5, 6 and 4 show a substantially identical negative electrode capacity value of about 14 mAh. For attaining high capacity, it is preferred that the coating amount becomes above the linear line. The coating amount y which is preferred for attaining the high capacity is represented by the following mathematical expression (2) according to the approximation in view of the oblique line on the curve:

$$y \ge 1.11x + 7.5 \qquad \text{mathematical expression (2)}.$$

In the same manner, a high capacity is maintained and high rate characteristics can be attained by defining the coating amount to a region below the curve formed by Examples 1, 5, 6 and 4. As described above, the coating amount y preferred for attaining the high rate characteristics is represented by the following mathematical expression (3) according to the approximation in view of the oblique line:

$$y < 1.11x + 7.5 \qquad \text{mathematical expression (3)}.$$

According to the present invention, the coating amount can be maximized with the rate characteristics maintained. Thus, the initial capacity can be improved.

The capacity retention rate of the negative electrode using the Si alloy can be increased as described above. Thus, the battery can be formed so that the capacity retention rate of the negative electrode is equal to or higher than the capacity retention rate of the positive electrode. And thereby the battery can be obtained in which the potential of the negative electrode does not increase remarkably (that is, does not cause an overdischarge) and the potential of the negative electrode does not increase to 3.3 V or higher which is a potential at which a copper is eluted. Therefore, the elution of Cu as the material constituting the negative electrode collector can be suppressed, which improves the safety of the lithium ion secondary battery.

What is claimed is:

1. A lithium ion secondary battery comprising:
   a positive electrode including a positive electrode active material;
   a negative electrode formed by coating a negative electrode active material mixture onto a surface of a negative electrode collector, the negative electrode active material mixture including a negative electrode active material, a conductive additive, and a binder;

a separator interposed between the positive electrode and the negative electrode; and an electrolyte, wherein the negative electrode active material includes a graphite and an Si alloy, relationships of 0.43≤x≤9.0 and 8≤y<18 are satisfied when a mass ratio of the graphite to the Si alloy is defined as x and a coating amount of the negative electrode active material mixture is defined as y (mg/cm2), and x and y satisfy the following mathematical expression (1):

$$y \leq -4.29x^{-1}+17.98 \qquad \text{mathematical expression (1).}$$

2. The lithium ion secondary battery according to claim 1, wherein x and y further satisfy the following mathematical expression (2):

$$y \geq 1.11x+7.5 \qquad \text{mathematical expression(2).}$$

3. The lithium ion secondary battery according to claim 1, wherein x satisfies 0.6≤x≤2.0.

4. The lithium ion secondary battery according to claim 2, wherein x satisfies 0.6≤x≤2.0.

5. The lithium ion secondary battery according to claim 1, wherein the Si alloy contains Si and one or more elements selected from a group consisting of Al, Ni, Cu, Fe, Ti, and Mn.

6. The lithium ion secondary battery according to claim 5, wherein a composition of the Si alloy is 50 to 90% in view of an atomic ratio of Si.

7. A lithium ion secondary battery comprising:

a positive electrode including a positive electrode active material;

a negative electrode formed by coating a negative electrode active material mixture onto a surface of a negative electrode collector, the negative electrode active material mixture including a negative electrode active material, a conductive additive, and a binder;

a separator interposed between the positive electrode and the negative electrode; and an electrolyte, wherein the negative electrode active material includes a graphite and an Si alloy, relationships of 0.43≤x≤9.0 and 8≤y<18 are satisfied when a mass ratio of the graphite to the Si alloy is defined as x and a coating amount of the negative electrode active material mixture is defined as y (mg/cm2), and x and y satisfy the following mathematical expression (2):

$$y \geq 1.11x+7.5 \qquad \text{mathematical expression (2).}$$

8. The lithium ion secondary battery according to claim 7, wherein x satisfies 0.6≤x≤2.0.

9. The lithium ion secondary battery according to claim 7, wherein the Si alloy contains Si and one or more elements selected from a group consisting of Al, Ni, Cu, Fe, Ti, and Mn.

10. The lithium ion secondary battery according to claim 9, wherein a composition of the Si alloy is 50 to 90% in view of an atomic ratio of Si.

11. A lithium ion secondary battery comprising:

a positive electrode including a positive electrode active material;

a negative electrode formed by coating a negative electrode active material mixture onto a surface of a negative electrode collector, the negative electrode active material mixture including a negative electrode active material, a conductive additive, and a binder;

a separator interposed between the positive electrode and the negative electrode; and an electrolyte, wherein the negative electrode active material includes a graphite and an Si alloy, relationships of 0.43≤x≤9.0 and 8≤y<18 are satisfied when a mass ratio of the graphite to the Si alloy is defined as x and a coating amount of the negative electrode active material mixture is defined as y (mg/cm2), and x and y satisfy the following mathematical expression (3):

$$y < 1.11x+7.5 \qquad \text{mathematical expression(3).}$$

12. The lithium ion secondary battery according to claim 11, wherein the Si alloy contains Si and one or more elements selected from a group consisting of Al, Ni, Cu, Fe, Ti, and Mn.

13. The lithium ion secondary battery according to claim 12, wherein a composition of the Si alloy is 50 to 90% in view of an atomic ratio of Si.

* * * * *